United States Patent
Shin et al.

(10) Patent No.: US 9,995,863 B2
(45) Date of Patent: Jun. 12, 2018

(54) POLARIZING PLATE AND LIQUID CRYSTAL DISPLAY COMPRISING THE SAME

(71) Applicant: SAMSUNG SDI CO., LTD., Yongin-si, Gyeonggi-do (KR)

(72) Inventors: Kwang Ho Shin, Uiwang-si (KR); Eun Su Park, Uiwang-si (KR); Dong Yoon Shin, Uiwang-si (KR); Hae Ryong Chung, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 188 days.

(21) Appl. No.: 14/842,727

(22) Filed: Sep. 1, 2015

(65) Prior Publication Data

US 2016/0062012 A1     Mar. 3, 2016

(30) Foreign Application Priority Data

Sep. 3, 2014 (KR) .................. 10-2014-0117077

(51) Int. Cl.
*G02B 5/30* (2006.01)
*G02F 1/1335* (2006.01)
(Continued)

(52) U.S. Cl.
CPC ........... *G02B 5/305* (2013.01); *G02B 5/3033* (2013.01); *G02B 5/3083* (2013.01);
(Continued)

(58) Field of Classification Search
None
See application file for complete search history.

(56) References Cited

U.S. PATENT DOCUMENTS 4,992,218 A * 2/1991 Sugio .................. G02B 5/3033
264/1.34
2009/0046224 A1* 2/2009 Iida ................... G02F 1/133634
349/96
(Continued)

FOREIGN PATENT DOCUMENTS

CN       103885112 A    6/2014
JP       2001-279002 A  10/2001
(Continued)

OTHER PUBLICATIONS

Taiwan Office action dated Nov. 24, 2016, corresponding to Taiwanese Patent Application No. 104129095 (5 pages).
KIPO Office action dated Oct. 29, 2015 in priority application No. 10-2014-0117077, 5 pages.
(Continued)

*Primary Examiner* — Anthony J Frost
(74) *Attorney, Agent, or Firm* — Lewis Roca Rothgerber Christie LLP

(57) ABSTRACT

A polarizing plate includes a polarizer, and a polyester film formed on one or both surfaces of the polarizer. The polyester film has a tensile strength ratio of about 3 or greater, as calculated by Equation 4, and an orientation displacement (°) of about −5° to about +5° with respect to a transverse direction (slow axis) of the polyester film at a wavelength of 550 nm. A liquid crystal display apparatus includes the polarizing plate Tensile strength ratio=TD tensile strength/MD tensile strength     Equation 4.

18 Claims, 3 Drawing Sheets

(51) Int. Cl.
*G02F 1/13363* (2006.01)
*G02B 1/14* (2015.01)

(52) U.S. Cl.
CPC .... *G02F 1/13363* (2013.01); *G02F 1/133528* (2013.01); *B32B 2457/202* (2013.01); *G02B 1/14* (2015.01); *G02F 1/133634* (2013.01); *G02F 2001/133531* (2013.01); *G02F 2202/40* (2013.01); *G02F 2413/12* (2013.01)

(56) References Cited

U.S. PATENT DOCUMENTS

| | | | |
|---|---|---|---|
| 2012/0270002 A1* | 10/2012 | Horiguchi | C09J 7/0225 428/41.5 |
| 2013/0120693 A1 | 5/2013 | Shin et al. | |
| 2014/0104519 A1* | 4/2014 | Murata | G02B 5/3033 349/15 |

FOREIGN PATENT DOCUMENTS

| | | | |
|---|---|---|---|
| JP | 2001279002 A | * | 10/2001 |
| JP | 2002-331576 A | | 11/2002 |
| JP | 2011-059488 A | | 3/2011 |
| JP | 2011123401 A | | 6/2011 |
| JP | 2011248178 A | | 12/2011 |
| KR | 10-2009-0037826 A | | 4/2009 |
| KR | 10-2013-0051825 A | | 5/2013 |
| KR | 10-2014-0080430 A | | 6/2014 |
| TW | 201300230 A | | 1/2013 |
| TW | 201325907 A | | 7/2013 |
| TW | 201326921 A | | 7/2013 |
| TW | 201430406 A | | 8/2014 |
| TW | 201432324 A | | 8/2014 |

OTHER PUBLICATIONS

China Office action dated May 2, 2017, corresponding to Chinese Patent Application No. 201510558231.9 (9 pages).

* cited by examiner

POLARIZING PLATE AND LIQUID CRYSTAL DISPLAY COMPRISING THE SAME

CROSS-REFERENCE TO RELATED APPLICATION

This application claims priority to and the benefit of Korean Patent Application No. 10-2014-0117077, filed on Sep. 3, 2014 in the Korean Intellectual Property Office, the entire content of which is incorporated herein by reference.

BACKGROUND

1. Technical Field

Embodiments of the present invention relate to a polarizing plate and a liquid crystal display comprising the same.

2. Description of the Related Art

Polarizing plates are used in various display apparatuses, and a typical polarizing plate includes a polarizer and a protective film formed on one or both surfaces of the polarizer. The polarizer is fabricated by uniaxially stretching a film in a machine direction (MD) to exhibit polarization properties. This stretching can cause the polarizer to shrink under high temperature/high humidity conditions. Shrinkage of the polarizer can cause deterioration in the degree of polarization by twisting the absorption axis of the polarizer, and can result in bending of the display panel on which the polarizing plate is mounted. A pressure-sensitive adhesive or a bonding agent is often used to control twisting of the absorption axis of the polarizer by controlling the stress on the polarizing plate during shrinkage. However, pressure-sensitive adhesives and bonding agents are limited in their ability to prevent twisting of the absorption axis of the polarizer, and can cause other problems (such as deteriorations in durability) even when they succeed in preventing polarizer axis twisting. In addition, when used as a protective film, a typical polyethylene terephthalate film can cause rainbow spots (e.g., Moiré patterns), which can become severe due to a reduction in the phase difference of the polarizing plate upon shrinkage.

SUMMARY

Embodiments of the invention provide a polarizing plate capable of suppressing (or reducing) deteriorations in the degree of polarization and panel bending by preventing (or reducing) axis twisting of the polarizer upon shrinkage of the polarizing plate.

In some embodiments of the present invention, a polarizing plate comprises a polarizer, and a polyester film formed on one or both surfaces of the polarizer. The polyester film has a tensile strength ratio of about 3 or greater, as calculated by Equation 4, and an orientation displacement (°) of about −5° to about +5° with respect to a transverse direction (slow axis) thereof at a wavelength of 550 nm.

$$\text{Tensile strength ratio} = \text{TD tensile strength/MD tensile strength} \quad \text{Equation 4}$$

In some embodiments of the present invention, a liquid crystal display may comprise the polarizing plate as set forth herein.

DETAILED DESCRIPTION

Figure 1:
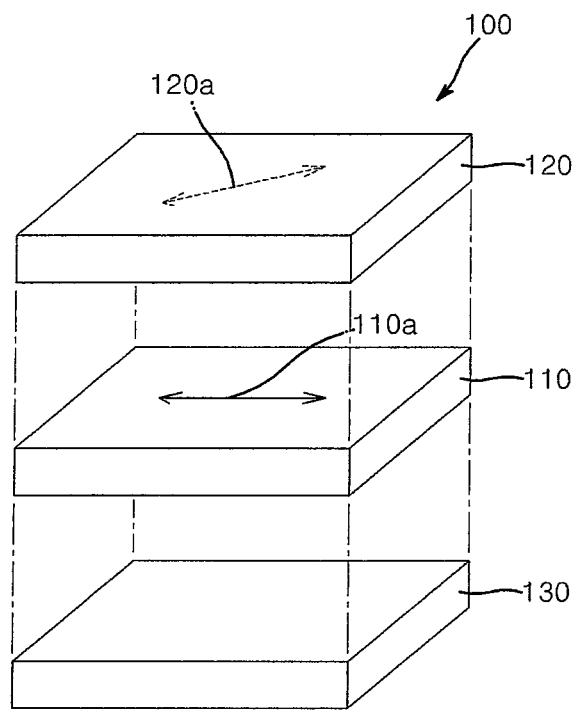
FIG. 1 is an exploded-out perspective view of a polarizing plate according to embodiments of the present invention.

Embodiments of the present invention are described with reference to the accompanying drawings. It should be understood that the described embodiments of the present invention may be modified in different ways and are not limited to the descriptions herein. In the drawings, portions irrelevant to the description are omitted for clarity. Like components are denoted by like reference numerals throughout the specification. As used herein, directional terms such as "upper" and "lower" are defined with reference to the accompanying drawings. Thus, it will be understood that the term "upper side" can be used interchangeably with the term "lower side".

Figure 2:
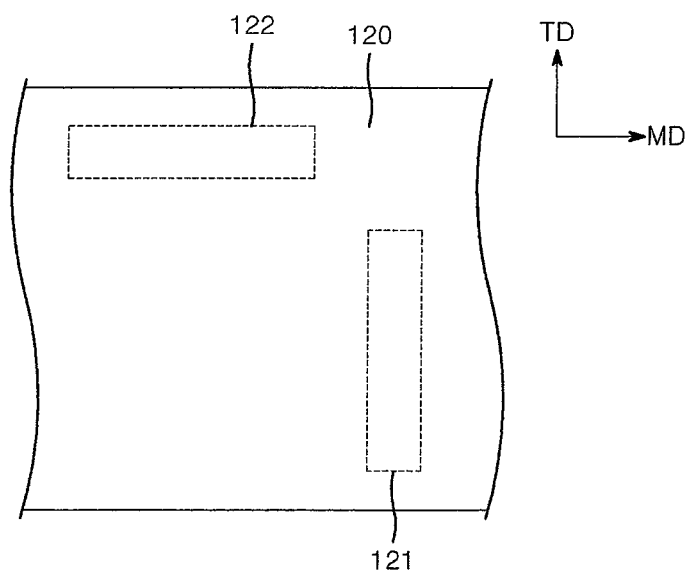
FIG. 2 is a conceptual diagram illustrating measurement of TD tensile strength and MD tensile strength of a polyester film.

FIG. 2 is a conceptual diagram illustrating measurement of transverse direction (TD) tensile strength and machine direction (MD) tensile strength of a polyester film. Referring to FIG. 2, the MD and the TD of the polyester film are orthogonal to each other. Here, to measure the TD and MD tensile strengths of a polyester film 120, a first rectangular sample 121 having a length in the TD and a width in the MD (length×width, about 150 mm×about 25 mm) is obtained from the polyester film 120, and a second rectangular sample 122 having a length in the MD and a width in the TD (length×width, about 150 mm×about 25 mm) is obtained from the polyester film 120. The first and second samples are used to measure the TD tensile strength and the MD tensile strength, respectively. Each of the samples has a thickness of about 100 μm or about 80 μm. High TD tensile strength of a film means that the film can realize high retardation to suppress (or reduce) the occurrence of rainbow spots (e.g., Moiré patterns) in an image. High TD tensile strength also means that the film can suppress (or reduce) deteriorations in the degree of polarization and panel bending by preventing (or reducing) axis twisting of the polarizer by suppressing (or reducing) shrinkage angle.

Figure 3:
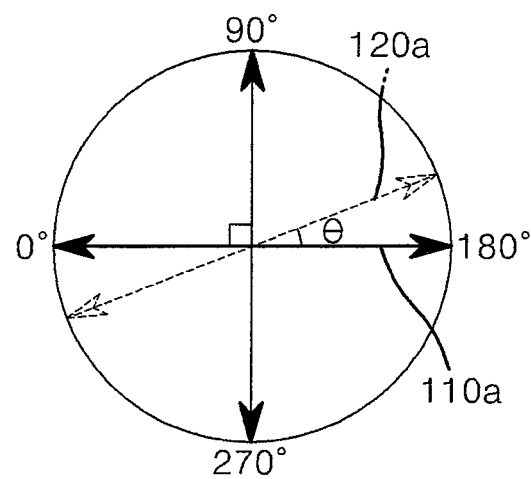
FIG. 3 is a conceptual diagram illustrating the transverse direction (TD) of the polyester film and a TD displacement (Θ) of the polarizer in the polarizing plate according to embodiments of the present invention.

FIG. 3 is a conceptual diagram illustrating the transverse direction (TD) of a polyester film and TD displacement of a polarizer. Referring to FIG. 3, in a polarizing plate, the TD 120a of a polyester film can be displaced by a predetermined angle (Θ) with respect to the TD 110a of the polarizer. In describing the displacement angle, "+" is defined as the counterclockwise direction with respect to the TD 110a of the polarizer, and "−" is defined as the clockwise direction of the MD 110a of the polarizer. Since the MD and the TD of the polarizer are orthogonal to each other, and the MD and the TD of the polyester film are orthogonal to each other, the displacement angle (Θ) can be applied to both the MD of the polarizer and the MD of the polyester film. For example, the MD of the polarizer may be placed at about 90° to the TD thereof, and the MD of the polyester film may be placed at about 90° to the TD thereof.

Next, a polarizing plate according to embodiments of the present invention is described with reference to FIG. 1. Referring to FIG. 1, a polarizing plate 100 according to embodiments of the present invention comprises a polarizer 110, a polyester film 120 formed on an upper surface of the polarizer 110, and an optical film 130 formed on a lower surface of the polarizer 110. The polyester film has a tensile strength ratio of about 3 or greater, as calculated by Equation 4, and an orientation displacement (°) of about −5° to about +5° with respect to the transverse direction (slow axis) thereof at a wavelength of 550 nm.

Tensile strength ratio=TD tensile strength/MD tensile strength        Equation 4

A polarizer is fabricated by uniaxially stretching a film in the MD, and thus the polarizer can shrink in the MD under high temperature/high humidity conditions, which shrinkage can generate twisting of an absorption axis of the polarizer. This twisting can thereby cause deterioration in the degree of polarization and panel bending when the polarizing plate is mounted on a display panel. When the polyester film has a tensile strength ratio of about 3 or greater and an orientation displacement (°) of about −5° to about +5° with respect to the transverse direction (slow axis) thereof, the MD of the polyester film holds the MD of the polarizer to suppress (or reduce) axis twisting of the polarizer when the polarizer is exposed to external environments of high temperature and/or high humidity. This prevents (or reduces) deteriorations in the degree of polarization, and minimizes panel bending when the polarizing plate is mounted on a liquid crystal display. For example, the polyester film may have a tensile strength ratio of about 3.0 to about 6.0 times, and an orientation displacement (°) of about −5° to about +5° with respect to the transverse direction (slow axis) thereof.

In some embodiments, the polyester film may have a tensile strength ratio of about 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0 times.

In some embodiments, the polyester film may have an orientation displacement (°) of about −5°, −4.5°, −4°, −3.5°, −3°, −2.5°, −2°, −1.5°, −10°, −0.5°, 0°, +0.5°, +1°, +1.5°, +2°, +2.5°, +3°, +3.5°, +4°, 4.5°, or +5° with respect to the transverse direction (slow axis) thereof.

The polyester film 120 may have a TD tensile strength of about 200 to about 400 MPa, and an MD tensile strength of about 60 to about 120 MPa. Within these ranges, the polyester film 120 has a tensile strength ratio of about 3 or greater, and thus can prevent (or reduce) axis twisting of the polarizer upon shrinkage of the polarizing plate.

In some embodiments, the polyester film 120 may have a TD tensile strength of about 200 MPa, 210 MPa, 220 MPa, 230 MPa, 240 MPa, 250 MPa, 260 MPa, 270 MPa, 280 MPa, 290 MPa, 300 MPa, 310 MPa, 320 MPa, 330 MPa, 340 MPa, 350 MPa, 360 MPa, 370 MPa, 380 MPa, 390 MPa, or 400 MPa.

In some embodiments, the polyester film 120 may have an MD tensile strength of about 60 MPa, 65 MPa, 70 MPa, 75 MPa, 80 MPa, 85 MPa, 90 MPa, 95 MPa, 100 MPa, 105 MPa, 110 MPa, 115 MPa, or 120 MPa.

To achieve a tensile strength ratio within the above range, the polyester film 120 may be prepared by stretching a melt extruded polyester resin to an elongation of about 2 to 10 times only in the TD, followed by tension-relaxation of the stretched polyester resin to a lower elongation while heating the stretched polyester resin within a specified temperature range.

The polyester film 120 may be prepared by TD stretching alone, without MD stretching, and may have a TD elongation of about 2 to about 10, and an MD elongation of about 1 to about 1.1. Here, an "MD elongation of about 1 to about 1.1" means that there is no additional stretching (or no significant additional stretching) except for stretching by a mechanical process (in the machine direction), and an elongation of about 1 means that the film is not stretched and is in a non-stretched state. Within this range, the polyester film having a ratio of TD tensile strength to MD tensile strength of about 3 or greater can be easily fabricated.

When the melt extruded polyester resin is stretched to an elongation within the ranges described above, the polyester film having a ratio of TD tensile strength to MD tensile strength of about 3 or greater can be easily fabricated. For example, the polyester film may have a TD elongation of about 3 to about 8 times. Stretching may be performed by at least one of dry stretching and/or wet stretching, and the stretching temperature may range from about (Tg−20)° C. to about (Tg+50)° C., where Tg is the glass transition temperature of the polyester resin. For example, in some embodiments, the stretching temperature may range from about 70° C. to about 150° C., about 80° C. to about 130° C., or about 90° C. to about 120° C. Within any of these ranges, it is possible to fabricate a polyester film having high retardation (as described above) and a tensile strength ratio (TD tensile strength/MD tensile strength) of about 3 or greater. In some embodiments, the polyester film 120 may have a TD elongation of about 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, or 8.0 times.

Next, the stretched polyester film may be subjected to tension-relaxation, thereby crystallizing and stabilizing the polyester film through heat treatment while stretching the polyester film in the transverse direction. As a result, even when the polyester film is left under high temperature and/or high humidity conditions, the polyester film can maintain a tensile strength ratio of about 3 or greater. For example, in performing the tension-relaxation, the polyester film may be heated in an oven at about 100° C. to about 300° C. for about 1 second to about 2 hours, and may have a TD elongation of greater than about 0 to about 3 times or less, for example about 0.1 to about 2 times, or about 0.1 to about 1 time. In some embodiments, in performing the tension-relaxation, the polyester film may have a TD elongation of about 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 times.

The polyester film 120 may be a film stretched to high elongation and having high retardation, and thus can prevent (or reduce) deteriorations in image quality by preventing (or reducing) the generation of rainbow spots when the polarizing plate is mounted on a liquid crystal display. In some embodiments, the polyester film 120 may have a front retardation (Ro) at a wavelength of 550 nm of about 5,000 nm or greater, for example about 5,000 nm to about 15,000 nm, or about 10,100 to about 12,000 nm. Within any of these ranges, when used as a protective film of the polarizer, the polyester film can prevent (or reduce) the generation of rainbow spots, suppress (or reduce) light leakage from the side surfaces of the polarizing plate, and prevent (or reduce) increases in the difference of retardation by preventing (or reducing) changes in retardation depending on the angle of incidence of light. In some embodiments, the polyester film 120 may have a front retardation (Ro) at a wavelength of 550 nm of about 5,000 nm, 5,100 nm, 5,200 nm, 5,300 nm, 5,400 nm, 5,500 nm, 5,600 nm, 5,700 nm, 5,800 nm, 5,900 nm, 6,000 nm, 6,100 nm, 6,200 nm, 6,300 nm, 6,400 nm, 6,500 nm, 6,600 nm, 6,700 nm, 6,800 nm, 6,900 nm, 7,000 nm, 7,100 nm, 7,200 nm, 7,300 nm, 7,400 nm, 7,500 nm, 7,600 nm, 7,700 nm, 7,800 nm, 7,900 nm, 8,000 nm, 8,100 nm, 8,200 nm, 8,300 nm, 8,400 nm, 8,500 nm, 8,600 nm, 8,700 nm, 8,800 nm, 8,900 nm, 9,000 nm, 9,100 nm, 9,200 nm, 9,300 nm, 9,400 nm, 9,500 nm, 9,600 nm, 9,700 nm, 9,800 nm, 9,900 nm, 10,000 nm, 10,100 nm, 10,200 nm, 10,300 nm, 10,400 nm, 10,500 nm, 10,600 nm, 10,700 nm, 10,800 nm, 10,900 nm, 11,000 nm, 11,100 nm, 11,200 nm, 11,300 nm, 11,400 nm, 11,500 nm, 11,600 nm, 11,700 nm, 11,800 nm, 11,900 nm, 12,000 nm, 12,100 nm, 12,200 nm, 12,300 nm, 12,400 nm, 12,500 nm, 12,600 nm, 12,700 nm, 12,800 nm, 12,900 nm, 13,000 nm, 13,100 nm, 13,200 nm, 13,300 nm, 13,400 nm, 13,500 nm, 13,600 nm, 13,700 nm, 13,800 nm, 13,900 nm, 14,000 nm, 14,100 nm, 14,200 nm, 14,300 nm, 14,400 nm, 14,500 nm, 14,600 nm, 14,700 nm, 14,800 nm, 14,900 nm, or 15,000 nm.

In addition, in some embodiments, the polyester film 120 may have a degree of biaxiality (NZ) at a wavelength of 550 nm of about 1.8 or lower, for example, about 1.4 to about 1.8, as calculated by Equation 1, and an out-of-plane retardation (Rth) at a wavelength of 550 nm of about 15,000 nm or lower, for example, about 10,000 to about 13,000 nm, as calculated by Equation 2. Within these ranges, the polyester film can suppress (or reduce) the generation of spots due to birefringence.

$$NZ=(nx-nz)/(nx-ny) \quad \text{Equation 1}$$

In Equation 1, nx, ny and nz are the indices of refraction at a wavelength of 550 nm in the x-, y- and z-axis directions, respectively, of the polyester film.

$$Rth=((nx+ny)/2-nz) \times d \quad \text{Equation 2}$$

In Equation 2, nx, ny and nz are the indices of refraction at a wavelength of 550 nm in the x-, y- and z-axis directions, respectively, of the polyester film, and d is a thickness of the retardation film in nm.

In some embodiments, the polyester film 120 may have a degree of biaxiality (NZ) at a wavelength of 550 nm of about 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, or 1.80, as calculated by Equation 1.

In some embodiments, the polyester film 120 may have an out-of-plane retardation (Rth) at a wavelength of 550 nm of about 10,000 nm, 10,100 nm, 10,200 nm, 10,300 nm, 10,400 nm, 10,500 nm, 10,600 nm, 10,700 nm, 10,800 nm, 10,900 nm, 11,000 nm, 11,100 nm, 11,200 nm, 11,300 nm, 11,400 nm, 11,500 nm, 11,600 nm, 11,700 nm, 11,800 nm, 11,900 nm, 12,000 nm, 12,100 nm, 12,200 nm, 12,300 nm, 12,400 nm, 12,500 nm, 12,600 nm, 12,700 nm, 12,800 nm, 12,900 nm, or 13,000 nm, as calculated by Equation 2.

In addition, in some embodiments, one of nx and ny of the polyester film is lower than 1.65, and the other of nx and ny of the polyester film is greater than or equal to 1.65 at a wavelength of 550 nm. This allows the polyester film (when used as a protective film) to suppress (or reduce) the generation of rainbow spots due to birefringence resulting from changes in retardation depending on the angle of incidence and wavelength of light. In some embodiments, the polyester film may have an index of refraction in the x-axis direction (nx) of about 1.65 or greater, for example about 1.67 to about 1.7, and an index of refraction in the y-axis direction (ny) of about 1.45 to about 1.60. In some embodiments, the polyester film may have an index of refraction in the y-axis direction (ny) of about 1.65 or greater, for example about 1.67 to about 1.72, or about 1.69 to about 1.72, and an index of refraction in the x-axis direction (nx) of about 1.45 to about 1.60. Here, an absolute value (|nx−ny|) of the difference between nx and ny may be about 0.1 to about 0.2, for example about 0.12 to about 0.18, in order to further improve the viewing angle while preventing (or reducing) the generation of rainbow spots.

The polyester film 120 may be any suitable transparent film formed of a polyester resin without limitation. For example, the polyester film 120 may be formed of at least one resin selected from polyethylene terephthalate, polybutylene terephthalate, polyethylene naphthalate, and polybutylene naphthalate.

The polyester film 120 may have a thickness of about 25 μm to about 115 μm. Within this range, the polyester film can be mounted on the polarizer and used in a polarizing plate. In some embodiments, the polyester film 120 may have a thickness of about 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 105 μm, 110 μm, or 115 μm.

Although not shown in FIG. 1, the polyester film 120 may comprise a functional coating layer (such as, for example, a hard coating layer, an anti-reflection layer, or an anti-fingerprint layer) formed on an upper surface thereof to impart an additional function to the polarizing plate. The functional layer may have a thickness of about 1 μm to about 10 μm. Within this thickness range of the functional layer, the polyester film 120 can be stacked on the polarizer and applied to the polarizing plate. In some embodiments, the functional coating layer may have a thickness of about 1 μm, 2 μm, 3 μm, 4 μm, 5 μm, 6 μm, 7 μm, 8 μm, 9 μm, or 10 μm.

In addition, although not shown in FIG. 1, the polyester film 120 may further comprise a surface coating layer on a lower surface thereof. The polyester film may have a hydrophobic surface, and polyethylene terephthalate films exhibit high hydrophobicity when used as protective films. To use such a polyester film in the polarizing plate, surface modification of the polyester film may be desired to convert the hydrophobic surface into a hydrophilic surface. Surface modification using sodium hydroxide (which is used in typical cellulose-based films) can provide insufficient modification, or can damage the surface of the film. Thus, a surface coating layer comprising a primer having hydrophobic and hydrophilic functional groups may be formed on the protective film. The primer having hydrophobic and hydrophilic functional groups may include polyester resins, polyvinyl acetate resins, and combinations thereof, but is not limited thereto. The surface coating layer may improve the mechanical properties and moisture permeability of the protective film, enabling the polarizing plate to exhibit high resistance to severe (or harsh) external conditions. Further, the surface coating layer may be formed between the protective film and the polarizing plate to improve adhesion between the protective film and the polarizer.

The polarizer may be fabricated by dyeing a polyvinyl alcohol film (for example, having a thickness of about 10 μm to about 100 μm) with iodine or a dichroic dye, followed by stretching the polyvinyl alcohol film in a specific direction. For example, the polarizer may be fabricated by swelling, dyeing, stretching, and crosslinking. For example, dyeing may be performed in a dyeing bath containing about 0.1 wt % to about 5.0 wt % of iodine or a dichroic dye at about 20° C. to about 80° C. for about 1 second to about 1 hour. Stretching may be performed to an elongation of about 1.0 to about 7.0 times in the MD. Dry etching may be performed in an aqueous solution at about 20° C. to about 100° C., and wet etching may be performed in an aqueous solution at about 20° C. to about 80° C. Crosslinking may be performed in an aqueous solution containing about 0.1 wt % to about 5.0 wt % of boric acid at about 20° C. to about 80° C. Stretching may be performed in a crosslinking solution containing boric acid.

In some embodiments, an acid catalyst-containing film may be prepared using a coating solution that contains an acid catalyst and polyvinyl alcohol (PVA), and dry stretching and dehydration to prepare a dehydrated film, which in turn may be subjected to hydration to prepare a hydrated film. Then, the hydrated film may be subjected to wet stretching and neutralization, thereby providing a polarizer.

The polarizer may have a thickness of about 5 μm to about 30 μm. Within this range, the polarizer can be used in a polarizing plate for liquid crystal displays (LCDs). In some embodiments, the polarizer may have a thickness of about 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, or 30 μm.

The optical film 130 may be stacked on one surface of the LCD panel and may have a retardation value in a specified range to compensate for viewing angle. For example, the optical film may have a front retardation (Ro) at a wavelength of 550 nm of about 40 to about 60 nm. Within this range of front retardation, the optical film can provide improved (or optimal) image quality. In some embodiments, the optical film may have a front retardation (Ro) at a wavelength of 550 nm of about 40 nm, 41 nm, 42 nm, 43 nm, 44 nm, 45 nm, 46 nm, 47 nm, 48 nm, 49 nm, 50 nm, 51 nm, 52 nm, 53 nm, 54 nm, 55 nm, 56 nm, 57 nm, 58 nm, 59 nm, or 60 nm.

The optical film 130 may have a thickness of about 25 μm to about 500 μm, for example, about 25 μm to about 60 μm. Within these ranges, the optical film can be used in the polarizing plate for liquid crystal displays. In some embodiments, the optical film 130 may have a thickness of about 25 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, or 500 nm.

The optical film 130 may be a transparent optical film formed of a polyester film or a non-polyester film. For example, the optical film may be formed of at least one of cellulose (including triacetyl cellulose and the like), polyester (including polyethylene terephthalate, polybutylene terephthalate, polyethylene naphthalate, polybutylene naphthalate and the like), cyclic polyolefin, polycarbonate, polyethersulfone, polysulfone, polyamide, polyimide, polyolefin, polyarylate, polyvinyl alcohol, polyvinyl chloride, and/or polyvinylidene chloride resins. In some embodiments, the optical film may be formed of a non-polyester film including at least one of cellulose, cyclic polyolefin, polycarbonate, polyethersulfone, polysulfone, polyamide, polyimide, polyolefin, polyarylate, polyvinyl alcohol, polyvinyl chloride, and/or polyvinylidene chloride resin films.

Although not shown in FIG. 1, a bonding layer may be formed between the polarizer 110 and the polyester film 120, and/or between the polarizer 110 and the optical film 130, to improve the mechanical strength of the polarizing plate. The bonding layer may comprise any suitable bonding agent, for example, at least one of a water-based bonding agent, a pressure-sensitive bonding agent, and/or a photocurable bonding agent. In addition, although not shown in FIG. 1, an adhesive layer may be further formed on a lower surface of the optical film 130 to stack the polarizing plate on the LCD panel. The adhesive layer may include a pressure-sensitive adhesive (PSA), but is not limited thereto.

The polarizing plate 100 may have a thickness of about 25 μm to about 500 μm. Within this range, the polarizing plate may be applied to liquid crystal displays. The polarizing plate may have a degree of polarization of about 99.99% or greater, for example, about 99.99% to about 99.999%, and a degree of transmittance of about 40% or greater, for example, about 40% to about 80%. Within these ranges, the polarizing plate 100 does not exhibit deteriorations in optical characteristics when mounted on a liquid crystal display.

In some embodiments, the polarizing plate may have a thickness of about 25 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, or 500 μm.

In some embodiments, the polarizing plate may have a degree of transmittance of about 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, or 80%.

The polarizing plate may have a variation rate of the polarization degree of about 0.00 to about 0.05%, as calculated by Equation 3. Within this range, the polarizing plate does not suffer from (or suffers from a reduced amount of) deteriorations in the degree of polarization (even upon shrinkage thereof), and thus can be applied to display apparatuses.

$$\text{Variation rate of polarization degree} = |P2-P1|/P1 \times 100 \quad \text{Equation 3}$$

In Equation 3, P1 is the initial degree of polarization of the polarizing plate, and P2 is the degree of polarization of the polarizing plate after being allowed to stand at about 85° C. for about 500 hours.

In some embodiments, the polarizing plate may have a variation rate of the polarization degree of about 0.00, about 0.01%, about 0.02%, about 0.03%, about 0.04%, or 0.05%, as calculated by Equation 3.

Figure 4:
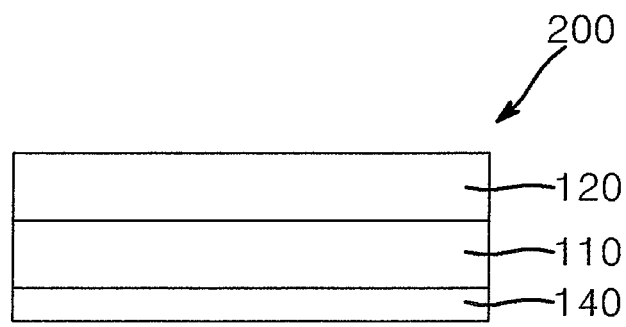
FIG. 4 is a schematic cross-sectional view of a polarizing plate according to embodiments of the present invention.

Next, a polarizing plate according to embodiments of the present invention is described with reference to FIG. 4. Referring to FIG. 4, a polarizing plate 200 may comprise a polarizer 110, a polyester film 120 formed on an upper surface of the polarizer 110, and a coating layer 140 formed on a lower surface of the polarizer 110. The polyester film may have a tensile strength ratio of about 3 or greater as calculated by Equation 4, and an orientation displacement (°) of about −5° to about +5° with respect to the transverse direction (slow axis) of the polyester film.

$$\text{Tensile strength ratio} = \text{TD tensile strength/MD tensile strength} \quad \text{Equation 4}$$

The polarizing plate depicted in FIG. 4 may be substantially the same as the polarizing plate described above in connection with FIG. 1 except that a coating layer 140 is formed instead of the optical film 130.

The coating layer may be composed of a cured product of an active-energy ray curable resin composition, which comprises an active-energy ray curable compound and a polymerization initiator. The coating layer can impart desirable adhesion, transparency, mechanical strength, thermal stability, moisture blocking performance, and durability to the polarizer.

The active-energy ray curable compound may include at least one selected from cation polymerizable curable compounds, radical polymerizable curable compounds, urethane resins, and silicone resins. The cation polymerizable curable compounds may include at least one of an epoxy compound containing at least one epoxy group in the backbone thereof, and an oxetane compound containing at least one oxetane ring in the backbone thereof. The radical polymerizable curable compound may be a (meth)acrylic compound having at least one (meth)acryloyloxy group. As used herein, the terms "(meth)acrylic compound," "(meth)acryloyloxy group" and like terms, may mean acrylic compounds and acryloyloxy groups and/or methacrylic compounds and methacryloyloxy groups, respectively.

The epoxy compound may include at least one selected from hydrogenated epoxy compounds, aliphatic epoxy compounds, alicyclic epoxy compounds, and/or aromatic epoxy compounds. In some embodiments, the epoxy compound may be at least one of a hydrogenated epoxy compound, an aliphatic epoxy compound, and/or an alicyclic epoxy compound, none of which have an aromatic ring therein.

The hydrogenated epoxy compound refers to a resin obtained by selective hydrogenation of an aromatic epoxy compound in the presence of a catalyst under pressure. Nonlimiting examples of the aromatic epoxy compound may include bisphenol type epoxy resins, such as diglycidyl ethers of bisphenol A, diglycidyl ethers of bisphenol F, and diglycidyl ethers of bisphenol S; novolac type epoxy resins, such as phenol novolac epoxy resins, cresol novolac epoxy resins, and hydroxybenzaldehyde phenol novolac epoxy resins; and polyfunctional epoxy resins, such as glycidyl ethers of tetrahydroxydiphenylmethane, glycidyl ethers of tetrahydroxybenzophenone, epoxylated polyvinyl phenol, and the like.

The aliphatic epoxy compound may include polyglycidyl ethers of aliphatic polyhydric alcohols or alkylene oxide adducts thereof. For example, the aliphatic epoxy compound may include polyglycidyl ethers of polyether polyols produced by adding one or more alkylene oxides to aliphatic polyhydric alcohols, such as diglycidyl ethers of 1,4-butanediol, diglycidyl ethers of 1,6-hexanediol, triglycidyl ethers of glycerin, triglycidyl ethers of trimethylolpropane, diglycidyl ethers of polyethylene glycol, diglycidyl ethers of propylene glycol, ethylene glycol, propylene glycol, or glycerin.

The alicyclic epoxy compound may refer to an epoxy compound having at least one epoxy group coupled to an alicyclic ring. Here, the "epoxy group coupled to an alicyclic ring" may have a structure represented by Formula 1.

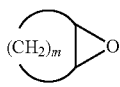

In Formula 1, m is an integer from 2 to 5.

Nonlimiting examples of the alicyclic epoxy compound may include 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, ethylene bis(3, 4-epoxycyclohexanecarboxylate), bis(3,4-epoxy-6-methyl-cyclohexylmethyl)adipate, diethylene glycol bis(3,4-epoxycyclohexylmethylether), ethylene glycol bis(3,4-epoxycyclohexylmethylether), 2,3,14,15-diepoxy-7,11,18, 21-tetraoxaspiro[5.2.2.5.2.2] heneicosane, 3-(3,4-epoxycyclohexyl)-8,9-epoxy-1,5-dioxaspiro[5.5]undecane, 4-vinylcyclohexene dioxide, limonene dioxide, bis(2,3-epoxycyclopentyl)ether, dicyclopentadiene dioxide, and the like.

The oxetane compound may be a compound having a tertiary-cyclic ether. For example, the oxetane compound may include 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, 3-ethyl-3-(2-ethylhexyloxymethyl)oxetane, phenol novolac oxetane, and/or the like.

The radical polymerizable curable compound can lead to a coating layer that exhibits desirable hardness and mechanical strength, and that has high durability.

The radical polymerizable curable compound may be obtained by reacting a (meth)acrylate monomer having at least one (meth)acryloyloxy group with two or more types of functional group-containing compounds, and may comprise a (meth)acryloyloxy group-containing compound, such as a (meth)acrylate oligomer, which has at least two (meth)acryloyloxy groups in the molecule.

Nonlimiting examples of the (meth)acrylate monomer may include a monofunctional (meth)acrylate monomer having a single (meth)acryloyloxy group, a bifunctional (meth)acrylate monomer having two (meth)acryloyloxy groups, and a polyfunctional (meth)acrylate monomer having three or more (meth)acryloyloxy groups.

Nonlimiting examples of the monofunctional (meth)acrylate monomer may include tetrahydrofurfuryl (meth)acrylate, 2-hydroxyethyl (meth)acrylate, 2- or 3-hydroxypropyl (meth)acrylate, 2-hydroxybutyl (meth)acrylate, 2-hydroxy-3-phenoxypropyl (meth)acrylate, isobutyl (meth)acrylate, t-butyl (meth)acrylate, 2-ethylhexyl (meth)acrylate, cyclohexyl (meth)acrylate, dicyclopentenyl (meth)acrylate, benzyl (meth)acrylate, isobornyl (meth)acrylate, phenoxyethyl (meth)acrylate, dicyclopentenyloxyethyl (meth)acrylate, dimethylaminoethyl (meth)acrylate, and the like.

The monofunctional (meth)acrylate monomer may be a (meth)acrylate monomer having a carboxylic acid group. For example, the monofunctional (meth)acrylate monomers may include 2-(meth)acryloyloxyethyl phthalic acid, 2-(meth)acryloyloxyethyl hexahydro phthalic acid, carboxyethyl (meth)acrylate, 2-(meth)acryloyloxyethyl succinic acid, and the like.

The bifunctional (meth)acrylate monomers may include alkylene glycol di(meth)acrylates, polyoxyalkylene glycol di(meth)acrylates, halogenated alkylene glycol di(meth) acrylates, di(meth)acrylates of aliphatic polyols, di(meth) acrylates of hydrogenated dicyclopentadiene or tricyclodecane dialkanol, di(meth)acrylates of dioxane glycol or dioxane dialkanol, di(meth)acrylates of bisphenol A or bisphenol F with alkylene oxide adducts, epoxy di(meth) acrylates of bisphenol A or bisphenol F.

The tri- or higher functional (meth)acrylate monomers may include glycerine tri(meth)acrylate, trimethylol propane tri(meth)acrylate, ditrimethylol propane tri(meth)acrylate, ditrimethylol propane tetra(meth)acrylate, pentaerythritol tri(meth)acrylate, pentaerythritol tetra(meth)acrylate, dipentaerythritol tetra(meth)acrylate, dipentaerythritol penta (meth)acrylate, dipentaerythritol hexa(meth)acrylate, and the like.

The (meth)acrylate oligomers may include a urethane (meth)acrylate oligomer, a polyester (meth)acrylate oligomer, an epoxy (meth)acrylate oligomer, and/or the like.

In some embodiments, the active energy ray-curable compound may include a mixture of an epoxy compound and an oxetane compound. In such a mixture, the epoxy compound may be present in an amount of about 40% by weight (wt %) to about 95 wt %, and the oxetane compound may be present in an amount of about 5 wt % to about 60 wt %.

In some embodiments, the epoxy compound may be present in the mixture in an amount of about 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, or 95 wt %.

In some embodiments, the oxetane compound may be present in the mixture in an amount of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, or 60 wt %.

The polymerization initiator may include at least one of a photo-radical polymerization initiator and a photo-cationic polymerization initiator.

As the photo-radical polymerization initiator, any suitable photo-radical polymerization initiator capable of performing a photocurable reaction can be used, without limitation. Nonlimiting examples of the photo-radical polymerization initiator may include phosphorus, triazine, acetophenone, benzophenone, thioxanthone, benzoin, oxime initiators, and mixtures thereof. In some embodiments, bisbenzoylphenyl phosphine oxide, benzoyldiphenyl phosphine oxide, and mixtures thereof may be used as the photo-radical polymerization initiator.

As the photo-cationic polymerization initiator, any suitable photo-cationic polymerization initiator capable of performing a photocurable reaction can be used, without limitation. For example, the photo-cationic polymerization initiator may include an onium salt including an onium ion (as a cation) and an anion. Nonlimiting examples of the onium ion (as the cation) may include diaryliodoniums such as diphenyliodonium, 4-methoxydiphenyliodonium, bis(4-methylphenyl)iodonium, bis(4-tert-butylphenyl)iodonium, bis(dodecylphenyl)iodonium, and the like; triarylsulfoniums such as triphenylsulfonium, diphenyl-4-thiophenoxyphenylsulfonium, and the like; bis[4-(diphenylsulfonio)-phenyl] sulfide; bis[4-(di(4-(2-hydroxyethyl)phenyl)sulfonio)-phenyl]sulfide; η5-2,4-(cyclopentadienyl)[1,2,3,4,5,6-η]-(methylethylybenzeneHron ($1^+$)), and the like. Nonlimiting examples of the anion may include tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$), and the like.

The polymerization initiator may be present in an amount of about 0.01 parts by weight to about 10 parts by weight based on 100 parts by weight of the active energy ray-curable compound. Within this range, the polymerization initiator can impart sufficient curing of the composition to provide high mechanical strength and good adhesion to the polarizer.

The active energy ray-curable compound may further comprise any desired additives, such as a silicone leveling agent, a UV absorbent, an antistatic agent, and/or the like. The additives may be present in an amount of about 0.01 parts by weight to about 1 part by weight based on 100 parts by weight of the active energy ray-curable compound. The coating layer may have a thickness of about 0.1 µm to about 10 µm.

Although not shown in FIG. 4, an adhesive layer may be further formed on a lower surface of the coating layer 140 to stack the polarizing plate on an LCD panel. The adhesive may include a pressure-sensitive adhesive, but is not limited thereto.

Figure 5:
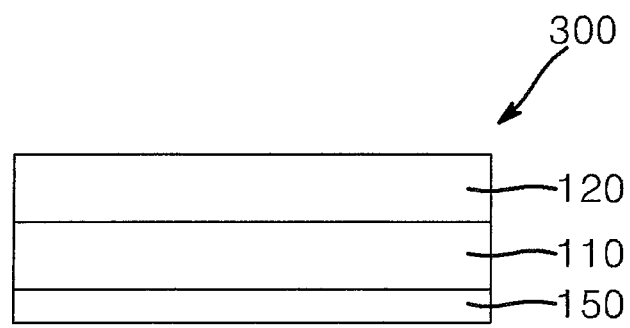
FIG. 5 is a schematic cross-sectional view of a polarizing plate according to embodiments of the present invention.

Next, a polarizing plate according to embodiments of the present invention is described with reference to FIG. 5. Referring to FIG. 5, a polarizing plate 300 may include a polarizer 110, a polyester film 120 formed on an upper surface of the polarizer 110, and an adhesive layer 150 formed on a lower surface of the polarizer 110. The polyester film may have a tensile strength ratio of about 3 or greater as calculated by the Equation: TD (transverse direction) tensile strength/MD (machine direction) tensile strength. Additionally, the polyester film may have an orientation displacement (°) of about −5° to about +5° with respect to the transverse direction (slow axis) of the polyester film.

Further, in the polarizing plate depicted in FIG. 5, an angle (Θr−p) between the absorption axis (Θp) of the polarizer and the optical axis (Θr) of the polyester film may range from about −0.3° to about +0.3°. Within this range, the polarizing plate can prevent (or reduce) reductions in the degree of polarization while minimizing (or reducing) the degree of bending when mounted on an LCD panel. In some embodiments, the angle (Θr−p) between the absorption axis (Θp) of the polarizer and the optical axis (Θr) of the polyester film may be about −0.3°, −0.2°, −0.1°, 0°, +0.1°, +0.2°, or +0.3°.

The polarizing plate depicted in FIG. 5 may be substantially the same as the polarizing plate described above in connection with FIG. 1 except that the adhesive layer 150 is formed instead of the optical film 130.

The adhesive layer 150 may be formed of an adhesive composition that includes a (meth)acrylic copolymer and a suitable crosslinking agent. The (meth)acrylic copolymer may include at least one of an alkyl group, a hydroxyl group, an aromatic group, a hetero-alicyclic group, an alicyclic group, and/or a carboxylic acid group. The crosslinking agent may include an isocyanate crosslinking agent, an imide crosslinking agent, and/or the like. The adhesive composition may further include a silane coupling agent to improve adhesion to a glass display panel. The adhesive layer may have a thickness of about 0.1 µm to about 30 µm. In some embodiments, the adhesive layer may have a thickness of about 0.1 µm, 0.5 µm, 1 µm, 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 21 µm, 22 µm, 23 µm, 24 µm, 25 µm, 26 µm, 27 µm, 28 µm, 29 µm, or 30 µm.

According to some embodiments of the present invention, a method of fabricating a polarizing plate includes stretching a melt extruded polyester resin to an elongation of about 2 to 10 times only in the TD, followed by tension-relaxation of the stretched polyester resin to a lower elongation while heating the stretched polyester resin within a specified temperature range. The fabricated polyester film may then be attached to one or both surfaces of a polarizer.

The method of fabricating the polyester film is described above.

The polarizer may be fabricated by dyeing a polyvinyl alcohol film with iodine or a dichroic dye, followed by stretching the polyvinyl alcohol film in a specific direction. The method of fabricating a polarizer is generally known to those skilled in the art.

When bonding the polyester film to the polarizer, the polyester film may be arranged to have an orientation displacement (°) of about −5° to about +5° with respect to the transverse direction (slow axis) of the polyester film, and may be bonded to the polarizer via a bonding agent. The bonding agent may include at least one of a water-based bonding agent, a pressure-sensitive bonding agent, and/or a photocurable bonding agent.

The fabrication method may further include bonding an optical film to the other surface of the polarizer using a bonding agent. The bonding agent may include at least one of a water-based bonding agent, a pressure-sensitive bonding agent, and/or a photocurable bonding agent.

The fabrication method may further include forming at least one of a coating layer and/or an adhesive layer on the other surface of the polarizer.

Figure 6:
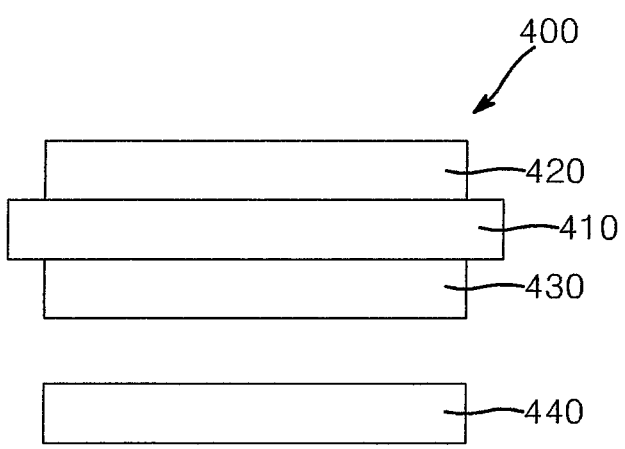
FIG. 6 is a schematic cross-sectional view of a liquid crystal display module according to embodiments of the present invention.

A liquid crystal display according to embodiments of the invention may include a liquid crystal display module including a polarizing plate described above. FIG. 6 is a schematic cross-sectional view of a liquid crystal display module according to embodiments of the invention. Referring to FIG. 6, a liquid crystal display (LCD) module 400 may include an LCD panel 410, a backlight unit 440 including a light source facing the LCD panel 410, a first polarizing plate 420 placed on an upper surface of the LCD panel 410, and a second polarizing plate 430 placed between a lower surface of the LCD panel 410 and the backlight unit 440. At least one of the first and second polarizing plates 420, 430 may include a polarizing plate according to embodiments of the present invention.

The LCD panel 410 may comprise a panel including a liquid crystal cell layer embedded between a first substrate (not shown) and a second substrate (not shown). In some embodiments, the first substrate may be a color filter (CF) substrate (upper substrate) and the second substrate may be a thin film transistor (TFT) substrate (lower substrate). The first substrate and the second substrate may be formed of the same or different materials, and may be, for example, glass substrates or plastic substrates. The plastic substrates may be formed of any plastic material applicable to flexible displays, for example, polyethylene terephthalate (PET), polycarbonate (PC), polyimide (PI), polyethylene naphthalate (PEN), polyether sulfone (PES), polyacrylate (PAR), and cycloolefin copolymer (COC), without being limited thereto. The liquid crystal cell layer may comprise liquid crystal cells arranged in a vertical alignment (VA) mode, an in-place switching (IPS) mode, a fringe field switching (FFS) mode, or a twisted nematic (TN) mode.

Each of the first and second polarizing plates may be formed on one surface of the LCD panel via an adhesive layer, which may be formed of any suitable adhesive, for example, a pressure sensitive adhesive.

Hereinafter, embodiments of the present invention are described with reference to some examples. It is understood that these examples are provided for illustration only and are not to be construed in any way as limiting the embodiments of the present invention.

(1) Material of polarizer: polyvinyl alcohol film (VF-PS6000, thickness: 60 μm, Kuraray, Japan)

(2) Polyethylene terephthalate film: polyethylene terephthalate as listed in Table 1.

(3) Optical film: triacetyl cellulose film (KC4DR-1, thickness: 40 μm, Konica, Japan).

Example 1

A 22 μm thick polarizer was prepared by stretching a polyvinyl alcohol film to an elongation of 3 times at 60° C., followed by adsorption with iodine and stretching to an elongation of 2.5 times in an aqueous solution of boric acid at 40° C. A polyethylene terephthalate resin was subjected to melt extrusion and stretched to an elongation of 6.1 times only in the TD (without MD stretching) under the conditions listed in Table 1, followed by crystallization and stabilization treatment through tension-relaxation, thereby preparing an 80 μm thick polyethylene terephthalate film. Then, at a wavelength of 550 nm, the orientation (unit: °) of the polyethylene terephthalate with respect to the TD (slow axis) of the film was measured. The polyethylene terephthalate film was bonded to one surface of the polarizer, and an optical film was bonded to the other surface of the polarizer, thereby fabricating a polarizing plate. The bonding agent was Z-200 (Nippon Goshei).

Examples 2 to 5 and Comparative Examples 1 to 3

Polarizing plates were fabricated as in Example 1 except that a polyethylene terephthalate resin was stretched under the conditions listed in Table 1, and then bonded to one surface of a polarizer such that the polyethylene terephthalate film had a displacement angle with respect to the TD of the polarizer as listed in Table 1.

Measurement of Physical Properties (1) Displacement angle: Displacement angle was confirmed by measuring the orientation (unit: °) of the polyethylene terephthalate (PET) film with respect to the slow axis (TD) of the PET film at 550 nm using a retardation tester, AxoScan (Axometrics Co., Ltd.).

(2) Θr–p: After constructing the layers corresponding to each of the respective layer structures of a polarizing plate, the angle (Θr–p, unit: °) between the absorption axis (Θp) of the polarizer and the optical axis (Θr) corresponding to the TD of the PET film was measured using an AxoScan tester (Axometrics Co., Ltd.).

(3) Variation in degree of polarization: For each of the polarizing plates, an initial degree of polarization (P1) was measured using a spectrophotometer, V7100 (JASCO, Japan). Then, the polarizing plate was left at high temperature for a long period of time (i.e., at 85° C. for 500 hours) to assess shrinkage of the polarizing plate, followed by measurement of the degree of polarization (P2) in the same manner. The variation rate (%) of the degree of polarization was calculated according to the Equation: |P2−P1|/P1×100.

(4) Bending degree: A polarizing plate was secured to a 0.5 mm thick glass plate via adhesives. After the polarizing plate was left at high temperature for a long period of time (i.e., at 85° C. for 500 hours), the maximum height of the polarizing plate from the floor bottom was measured using Vernier calipers.

(5) Occurrence of rainbow spots: Polarizing plates were placed on an upper surface of an LCD panel (VA mode), and between a lower surface of the LCD panel and the backlight unit. The occurrence of rainbow spots was observed using a spectroradiometer (SR-3A, Topcon). No occurrence of rainbow spots was rated as x, slight occurrence of rainbow spots was rated as Δ, medium occurrence of rainbow spots was rated as ○, and severe occurrence of rainbow spots rated as ⊚. In addition, the polarizing plate was left at a high temperature for a long period of time (i.e., at 85° C. for 500 hours) and evaluated as to the occurrence of rainbow spots in the same manner.

(6) Polarizer, tensile strength ratio, and retardation (Ro) of PET film: From a polyethylene terephthalate (PET) resin, a first rectangular sample (1) having a length corresponding to the TD and a width corresponding to the MD (length×width, 150 mm×25 mm), and a second rectangular sample (2) having a length corresponding to the MD and a width corresponding to the TD (length×width, 150 mm×25 mm) were obtained. For the samples 1 and 2, TD tensile strength and MD tensile strength were respectively measured using a universal test machine (UTM), followed by calculation of the tensile strength ratio (i.e., TD tensile strength/MD tensile strength). The front retardation (Ro) of the polarizing plate was measured at a wavelength of 550 nm using an AxoScan tester (Axometrics Co., Ltd.).

As shown in Table 2, the polarizing plates according to embodiments of the present invention exhibited low variation in the degree of polarization by suppressing (or reducing) axis twisting of the polarizer upon shrinkage thereof. The polarizing plates according to embodiments of the present invention also showed a low degree of bending, and did not suffer from the occurrence of rainbow spots. On the contrary, the polarizing plate of Comparative Example 1 (including a PET film having a tensile strength ratio of less than 3) had a high variation rate in the degree of polarization, and suffered from the occurrence of rainbow spots. In addition, even when the polarizing plates included a PET film having a tensile strength ratio of 3 or greater, the polarizing plates of Comparative Examples 2 and 3 (which had an orientation displacement (°) outside the range of about −5° to about +5° with respect to the transverse direction (slow axis) of the PET film) did not suffer from the occurrence of rainbow spots. However, these polarizing plates had an angle between the absorption axis (Θp) of the polarizer and the optical axis (Θr) of the PET film outside the range of −0.3° to +0.3°, thereby causing a high variation rate in the degree of polarization, and a high degree of bending.

TABLE 1

| | | | PET film | | | | |
|---|---|---|---|---|---|---|---|
| | Tension-relaxation | | TD tensile | MD tensile | Tensile | | Displacement |
| | Treatment | Temperature (° C.) | strength (MPa) | strength (MPa) | strength ratio | Ro (nm, at 550 nm) | angle (θ, °) |
| Example 1 (Thickness: 100 μm) | ○ | 110 | 319 | 83 | 3.83 | 10,550 | +0.2 |
| Example 2 (Thickness: 100 μm) | ○ | 150 | 331 | 84 | 3.94 | 10,380 | 0 |
| Example 3 (Thickness: 80 μm) | ○ | 110 | 262 | 75 | 3.49 | 8,460 | +5.0 |
| Example 4 (Thickness: 80 um) | ○ | 110 | 262 | 75 | 3.49 | 8,460 | −5.0 |
| Example 5 | ○ | 150 | 288 | 77 | 3.74 | 8,320 | −0.2 |
| Comparative Example 1 | X | 25 | 247 | 102 | 2.42 | 4,800 | +0.4 |
| Comparative Example 2 | ○ | 110 | 319 | 83 | 3.83 | 10,550 | −5.7 |
| Comparative Example 3 | ○ | 110 | 319 | 83 | 3.83 | 10,550 | +6.6 |

The polarizing plates of the Examples and Comparative Examples were evaluated as to the following properties, and the results are shown in Table 2.

TABLE 2

| | Θr-p (°) | Variation in degree of polarization (%) | Degree of bending (mm) | Rainbow spot |
|---|---|---|---|---|
| Example 1 | 0.05 | 0.01 | 1.4 | X |
| Example 2 | 0.01 | 0.005 | 0.6 | X |
| Example 3 | 0.13 | 0.03 | 1.6 | X |
| Example 4 | 0.14 | 0.03 | 1.7 | X |
| Example 5 | 0.07 | 0.02 | 0.8 | X |
| Comparative Example 1 | 0.18 | 0.06 | 2.1 | ○ |
| Comparative Example 2 | 0.41 | 0.08 | 2.7 | X |
| Comparative Example 3 | 0.44 | 0.10 | 2.9 | X |

While exemplary embodiments of the present invention have been illustrated and described, and although specific terms are employed in this disclosure, the embodiments and terms are used herein, and are to be interpreted, in a generic and descriptive sense only and not for purpose of limitation. In some instances, as would be apparent to one of ordinary skill in the art, features, characteristics, and/or elements described in connection with certain embodiments may be used alone or in combination with features, characteristics, and/or elements described in connection with other embodiments, unless otherwise specifically indicated. Accordingly, it will be understood by those of skill in the art that various changes and modifications may be made to the described embodiments without departing from the spirit and scope of the present invention as set forth in the following claims.

What is claimed is:

1. A polarizing plate, comprising:
   a polarizer; and
   a polyester film on a surface of the polarizer,
   wherein the polyester film has a tensile strength ratio of 3 or greater, as calculated by Equation 4, and an orientation displacement) (°) of about −5° to about +5°, the orientation displacement being an angle at which a transverse direction (TD) of the polyester film is displaced with respect to a transverse direction of the polyester film at a wavelength of 550 nm:

$$\text{Tensile strength ratio} = \text{TD tensile strength/MD tensile strength}, \quad \text{Equation 4}$$

In Equation 4, TD tensile strength is a tensile strength of the polyester film in the transverse direction, and MD tensile strength is a tensile strength of the polyester film in the machine direction; and
   wherein the TD tensile strength of the polyester film is 200 MPa to 400 MPa, and the MD tensile strength of the polyester film is 60 MPa to 120 MPa.

2. The polarizing plate according to claim 1, wherein the polarizing plate has an angle (Θr−p) between an absorption axis (Θp) of the polarizer and an optical axis (Θr) of the polyester film of about −0.3° to about +0.3°.

3. The polarizing plate according to claim 1, wherein the polyester film has an in-plane retardation (Ro) at a wavelength of 550 nm of about 5,000 nm to about 15,000 nm.

4. The polarizing plate according to claim 1, wherein the polyester film has a degree of biaxiality (NZ) at a wavelength of 550 nm of about 1.8 or lower, as calculated by Equation 1:

$$NZ = (nx-nz)/(nx-ny), \quad \text{Equation 1}$$

wherein nx, ny and nz are indices of refraction at a wavelength of 550 nm in x-, y- and z-axis directions of the polyester film, respectively.

5. The polarizing plate according to claim 1, wherein the polyester film comprises at least one of polyethylene terephthalate, polybutylene terephthalate, polyethylene naphthalate, and/or polybutylene naphthalate.

6. The polarizing plate according to claim 1, further comprising:
   at least one of an optical film, a coating layer and/or an adhesive layer formed on an other surface of the polarizer.

7. The polarizing plate according to claim 6, wherein the optical film has an in-plane retardation (Ro) at a wavelength of 550 nm of about 40 to about 60 nm.

8. The polarizing plate according to claim 6, wherein the optical film comprises at least one of a cellulose resin, a polyester resin, a cyclic polyolefin resin, a polycarbonate resin, a polyethersulfone resin, a polysulfone resin, a polyamide resin, a polyimide resin, a polyolefin resin, a polyarylate resin, a polyvinyl alcohol resin, a polyvinyl chloride resin, and/or a polyvinylidene chloride resin.

9. The polarizing plate according to claim 1, wherein the polarizing plate has a variation rate of a polarization degree of about 0.00 to about 0.05%, as calculated by Equation 3:

$$\text{Variation rate of polarization degree} = |P2-P1|/P1 \times 100 \quad \text{Equation 3}$$

wherein P1 is an initial degree of polarization of the polarizing plate, and P2 is a degree of polarization of the polarizing plate after being left at about 85° C. for about 500 hours.

10. A liquid crystal display comprising the polarizing plate according to claim 1.

11. The liquid crystal display according to claim 10, wherein the polarizing plate has an angle (Θr−p) between an absorption axis (Θp) of the polarizer and an optical axis (Θr) of the polyester film of about −0.3° to about +0.3°.

12. The liquid crystal display according to claim 10, wherein the polyester film has in-plane retardation (Ro) at a wavelength of 550 nm of about 5,000 nm to about 15,000 nm.

13. The liquid crystal display according to claim 10, wherein the polyester film has a degree of biaxiality (NZ) at a wavelength of 550 nm of about 1.8 or lower, as calculated by Equation 1:

$$NZ = (nx-nz)/(nx-ny), \quad \text{Equation 1}$$

wherein nx, ny and nz are indices of refraction at a wavelength of 550 nm in x-, y- and z-axis directions of the polyester film, respectively.

14. The liquid crystal display according to claim 10, wherein the polyester film comprises at least one of polyethylene terephthalate, polybutylene terephthalate, polyethylene naphthalate, and/or polybutylene naphthalate.

15. The liquid crystal display according to claim 10, wherein the polarizing plate further comprises:
    at least one of an optical film, a coating layer and/or an adhesive layer formed on an other surface of the polarizer.

16. The liquid crystal display according to claim 15, wherein the optical film has an in-plane retardation (Ro) at a wavelength of 550 nm of about 40 to about 60 nm.

17. The liquid crystal display according to claim 15, wherein the optical film comprises at least one of a cellulose resin, a polyester resin, a cyclic polyolefin resin, a polycarbonate resin, a polyethersulfone resin, a polysulfone resin, a polyamide resin, a polyimide resin, a polyolefin resin, a polyarylate resin, a polyvinyl alcohol resin, a polyvinyl chloride resin, and/or a polyvinylidene chloride resin.

18. The liquid crystal display according to claim 10, wherein the polarizing plate has a variation rate of a polarization degree of about 0.00 to about 0.05%, as calculated by Equation 3:

$$\text{Variation rate of polarization degree} = |P2-P1|/P1 \times 100 \quad \text{Equation 3}$$

wherein P1 is an initial degree of polarization of the polarizing plate, and P2 is a degree of polarization of the polarizing plate after being left at about 85° C. for about 500 hours.

* * * * *